(12) United States Patent
Fontaine et al.

(10) Patent No.: US 11,041,094 B2
(45) Date of Patent: Jun. 22, 2021

(54) SOLVENT-FREE SHELLAC COATING COMPOSITION

(71) Applicant: Mantrose-Haeuser Co., Inc., Lincoln, RI (US)

(72) Inventors: Katie L. Fontaine, Rumford, RI (US); Margaret McWeeney, East Boston, MA (US); Stephen A. Santos, Cumberland, RI (US); Bin Zhong, Attleboro, MA (US); Paul J. Pothier, Warwick, RI (US)

(73) Assignee: MANTROSE-HAEUSER CO., INC., Lincoln, RI (US)

( * ) Notice: Subject to any disclaimer, the term of this patent is extended or adjusted under 35 U.S.C. 154(b) by 0 days.

(21) Appl. No.: 14/948,636

(22) Filed: Nov. 23, 2015

(65) Prior Publication Data
US 2016/0208139 A1 Jul. 21, 2016

Related U.S. Application Data

(60) Provisional application No. 62/103,660, filed on Jan. 15, 2015.

(51) Int. Cl.
| | |
|---|---|
| *A23P 20/10* | (2016.01) |
| *A21D 13/26* | (2017.01) |
| *C09D 193/02* | (2006.01) |
| *A21D 15/08* | (2006.01) |
| *A23G 9/50* | (2006.01) |
| *A23D 9/00* | (2006.01) |
| *A21D 13/24* | (2017.01) |
| *A21D 13/28* | (2017.01) |

(52) U.S. Cl.
CPC ........... *C09D 193/02* (2013.01); *A21D 13/24* (2017.01); *A21D 13/26* (2017.01); *A21D 13/28* (2017.01); *A21D 15/08* (2013.01); *A23D 9/00* (2013.01); *A23G 9/506* (2013.01); *A23P 20/10* (2016.08); *A23P 20/11* (2016.08)

(58) Field of Classification Search
USPC ...................................... 426/302, 305, 307
See application file for complete search history.

(56) References Cited

U.S. PATENT DOCUMENTS

| | | | |
|---|---|---|---|
| 4,661,359 A | 4/1987 | Seaborne et al. | |
| 4,710,228 A | 12/1987 | Seaborne et al. | |
| 6,348,217 B1 | 2/2002 | Santos et al. | |
| 6,620,431 B1 | 9/2003 | Signorino | |
| 6,869,628 B2 | 3/2005 | Krochta et al. | |
| 2004/0096548 A1 | 5/2004 | Stevens et al. | |
| 2004/0166211 A1* | 8/2004 | Gesford | A23G 3/0095 426/273 |
| 2006/0075927 A1* | 4/2006 | Shobu | A23G 1/305 106/238 |
| 2006/0233917 A1* | 10/2006 | Shobu | A61K 9/2009 426/89 |
| 2009/0246318 A1* | 10/2009 | Johansen | A21D 2/145 426/21 |
| 2011/0212226 A1* | 9/2011 | Soane | A23P 20/12 426/96 |
| 2011/0236557 A1 | 9/2011 | Suzuki et al. | |
| 2015/0024060 A1 | 1/2015 | Madhavi et al. | |
| 2015/0025051 A1 | 1/2015 | Zhang et al. | |
| 2015/0025104 A1 | 1/2015 | Madhave et al. | |

FOREIGN PATENT DOCUMENTS

| | | |
|---|---|---|
| CN | 102187895 A | 9/2011 |
| CN | 104705392 A | 6/2015 |
| EP | 0988801 A | 3/2000 |
| JP | 2006262764 A | 10/2006 |
| JP | 2009219433 A | 10/2009 |
| WO | 2013051687 A1 | 4/2013 |

OTHER PUBLICATIONS

Wei Xueqin et al., "Structure and properties of moisture-resistant konjac glucomannan films coated with shellac/stearic acid coating", Carbohydrate Polymers, Applied Science Publishers, Ltd., Barking, GB, vol. 118, Nov. 15, 2014, pp. 119-125, XP029122669.
Hagenmaier, Robert D. et al., "Wax Microemulsions and Emulsions as Citrus Coatings", Journal of Agricultural and Food Chemistry, vol. 42, No. 4, Apr. 1, 1994, pp. 899-902, XP055262206.
Minina S., et al., Coating Glutamic-Acid Tablets with Shellac Based Material, Khimiko-Farmatsevticheskii Zhurnal, vol. 18, No. 2, 1984 pp. 215-219, Database Biosis Biosciences Information Service, Philadelphia PA, US 1984.
International Search Report and Written Opinion for International Application No. PCT/US2016/012402 dated Apr. 19, 2016.
Search Report and Written Opinion for Singapore Patent Application No. 112017055995 dated Jul. 4, 2018.
Patel, A.R., et al. Edible application of shellac oleogels; spreads, chocolate past and cakes. Food & Function, Mar. 3, 2014, vol. 5, No. 4, pp. 645-652, Figures 1, 4 and 7; Experimental and ref. 16.
First Office Action for Chinese Patent Application No. 201680005612.7 dated Dec. 21, 2018.
Response to First Office Action for Chinese Patent Application No. 201610149869.1 dated Apr. 15, 2019.
Examination Report for European Patent Application No. 16706022.7 dated Apr. 4, 2019.
"Shellac, Official Methods of Analysis, Standards, Specifications and General Information on Shellac and Bleached Shellac," Approved by The American Bleach Shellac Manufacturers' Association and The United States Shellac Importers' Association, Inc., New York, 1957.
"Process of Stiffening Hats and the Hats Thus Produced," Haakh, et al., Serial No. 337,664, filed May 28, 1940, published May 11, 1943 under the Alien Property Custodian Act.

(Continued)

*Primary Examiner* — Lien T Tran
(74) *Attorney, Agent, or Firm* — Calfee, Halter & Griswold LLP

(57) ABSTRACT

A shellac coating composition for producing a shellac coating on a substrate comprises a fatty acid component, shellac and little or no volatile carrier liquid. Because the fatty acid inhibits the polymerization of the shellac when molten, the composition can be converted into a liquid state for coating purposes by simple heating, thereby eliminating the need for the volatile carrier liquid.

26 Claims, No Drawings

(56) References Cited

OTHER PUBLICATIONS

English translation of Notice of Reasons for Rejection for Japanese Patent Application No. 2017-536787 dated Nov. 11, 2019.
Tuerck, Paul A., "Formula Modifications in a Solvent-Free Tablet Film Coat", Journal of Pharmaceutical Sciences; vol. 62; No. 9; Sep. 1973; pp. 1534-1537.
English translation of Examination Report for Israeli Patent Application No. 253283 dated May 5, 2020.
First Examination Report for Indian Patent Application No. 201717024285 dated Nov. 20, 2019.
Examination Report from Philippine Patent Application No. 1/2017/501250 dated Aug. 26, 2020.
Office Action from Canadian Patent Application No. 2,972,976 dated Oct. 6, 2020.
Communication pursuant to Article 94(3) EPC from European Application No. 16706022.7 dated Sep. 22, 2020.
Examination Report from Malaysia Patent Application No. PI 2017001018 dated Feb. 9, 2021.

\* cited by examiner

SOLVENT-FREE SHELLAC COATING COMPOSITION

CROSS-REFERENCE TO RELATED APPLICATION

This application claims priority to application Ser. No. 62/103,660, filed Jan. 15, 2015, the disclosure of which is incorporated herein by reference.

BACKGROUND

Shellac has been used as a coating for a variety of products, including food products, for many years. For example, shellac has been used for many years as a glazing agent for confections such as chocolate covered raisins, chocolate covered nuts, gum balls, jelly beans, etc. In addition, shellac has also been used for many years as a protective coating and glaze for vitamins, tablets, various time-release preparations, and various fruits such as apples and the like, both whole and in sections. In addition, many patents and other publications describe using shellac as a glazing agent for a variety of different food products, including donuts. See, for example, the background section of U.S. Pat. No. 6,869,628 as well as Paragraph [0006] of U.S. 2004/0096548.

Because shellac readily polymerizes when molten, it has not been used to coat substrates in molten form as a practical matter. Rather, it has been necessary to dissolve or disperse the shellac in a suitable volatile carrier liquid to produce shellac coating compositions which are liquid enough (i.e., will flow enough) to function as effective coating compositions.

SUMMARY OF INVENTION

In accordance with this invention, it has been found that polymerization of shellac when molten can be inhibited by combining it with a small but suitable amount of a fatty acid. As a result, new shellac coating composition are provided which are solvent-free in the sense of containing minimal and preferably no volatile carrier liquid, it having been found that simple heating of these compositions will make them sufficiently liquid to serve as effective coating compositions.

Thus, this invention provides a shellac coating composition for producing a shellac coating on a substrate, the shellac coating composition comprising a fatty acid component and shellac, wherein the weight ratio of the fatty acid component to the shellac is 5:95 to 95:5, and further wherein the coating composition contains no more than 10 wt. % of a volatile carrier liquid having an equilibrium vapor pressure at 25° C. above 0.02 atm (15.9 torr).

In addition, this invention also provides a process for providing a shellac coating on a substrate comprising applying this coating composition to the substrate.

DETAILED DESCRIPTION

Definitions

For the purposes of this disclosure, "coating composition" refers to a composition which can be used to form a coating on a substrate but excludes compositions which are already in the form of a coating on a substrate. So, for example, a coating composition can be in the form of a coating liquid which can be poured or sprayed onto a substrate, for example, to form a completed coating. In addition, a coating composition can also be in the form of a solid such as a powder, course granules, flakes or even a large solid block, which can be melted to form such a coating liquid. However, for the purposes of this disclosure "coating composition" will be understood as not referring to the coating that is produced by such a coating liquid. So, for example, a film which has been cast upon a substrate and remains on that substrate is not a "coating composition" in the context of this disclosure, because it is the form of a completed coating. However, if that same film is removed from its substrate, then it will be regarded as a "coating composition," at least if it can be used to form a new coating such as by melting or the like.

Also, "liquid" in reference to a coating composition means that the coating composition has a sufficiently low viscosity so that, after being deposited on a horizontal substrate and left undisturbed, it will form a continuous, coherent coating on that substrate. Also, a coating which is "continuous" in the context of this disclosure means a coating which is not present on the substrate in the form of discrete clumps or regions but rather is present as an amalgamated mass. In addition, a coating which is "coherent" in the context of this disclosure means a coating which is free of pores and pinholes.

Shellac Resin

Shellac is a naturally occurring thermoplastic resin obtained from secretions of the female lac bug. It exhibits a remarkable combination of properties making it an ideal barrier coating, these properties including low permeabilities to oxygen, water vapor, $CO_2$, ethylene and various odors, low lipid solubility, excellent color and excellent clarity. Its main components are aleuritic acid and shelloic acid.

Commercially, shellac is available in two different types, bleached shellac and orange shellac. Moreover, both of these shellacs are available in refined (i.e., dewaxed) as well as unrefined (regular) versions. In addition, each of these four different varieties of shellac are available in different physical forms, e.g., solid flakes and aqueous and/or alcohol solutions. In addition, some of these different varieties are also available in different grades. For example, dewaxed orange shellac is available in a variety of different grades ranging from yellow to red.

Shellac is obtained from seedlac, an insect secretion, by removing debris from the seedlac and then further processing the seedlac to obtain the desired product. As described in U.S. Pat. No. 6,348,217, the entire disclosure of which is incorporated herein by reference, bleached shellac is made by dissolving seedlac in aqueous alkali and then adding a bleaching agent such as sodium hypochlorite. The product so obtained is then precipitated and dried to produce regular bleached shellac. Alternatively, the dissolved bleached shellac can be refined by known techniques to remove its wax content before precipitating and drying, thereby producing dewaxed bleached shellac. In contrast, regular orange shellac is made by melting seedlac, sieving out the insolubles and then solidifying and flaking the product so obtained. Meanwhile, dewaxed orange shellac is made by dissolving the seedlac in alcohol, straining out the insolubles, filtering out wax particles and passing the solution so obtained through activated carbon to decolorize before solidifying and flaking.

These different forms of shellac have somewhat different melting temperatures. Unfortunately, all of these forms of shellac readily polymerize when heated above their melting temperatures. Therefore, it is necessary when producing coating compositions from shellac to dissolve or disperse the shellac in a volatile carrier liquid. Examples of suitable carrier liquids that can be used for this purpose include water, various alcohols such as methanol, ethanol, isopropanol, etc. various ketones such as acetone, methyl ethyl ketone, etc., various glycols such as propylene glycol, etc., various glycol ethers, various esters such as ethyl acetate, and so forth. Generally speaking, these volatile carrier liquids have equilibrium vapor pressures above 0.02 atm (15.9 torr). For example, a typical equilibrium vapor pressure of water at 25° C. is 0.03 atm (22.8 torr), of ethyl alcohol at 25° C. is 0.077 atm (58.5 torr), and of 2-propanol at 25° C. is 0.059 atm (44.8 torr).

In accordance with this invention, using such volatile carrier liquids is avoided, it having been found that polymerization of all commercial forms and grades of shellac when heated to above their melting points can be inhibited by blending the shellac with a fatty acid component, as further discussed below. This is of particular importance in connection with coating substrates which are sensitive to these volatile carrier liquids, as contact of the substrate with these carrier liquids can be completely avoided. Examples of such substrates include bakery products such as biscuits, cookies, wafers, waffles and ice cream cones, as well as various water-sensitive dry products such as flours, grains, seeds and certain nuts.

This is also important in terms of eliminating the use of volatile organic compounds. Ethanol and the other organic liquids normally used to make conventional shellac coating compositions are highly flammable as well as classified as Volatile Organic Compounds (VOC's) under relevant federal and state statutes and regulations. Therefore, considerable care and expense must be undertaken when using shellac coating compositions formulated with one or more of these VOC's as its carrier liquid. These problems can be completely avoided by this invention, because these VOC's are completely unnecessary.

Still another important feature of the inventive shellac coating compositions is that the shellac coatings they produce are highly resistant to "blushing." As well appreciated in the art, when shellac coatings made from conventional shellac coating compositions are exposed to water, they often develop a significant whitish haze, which is known in the art as "blushing." This problem is essentially avoided in accordance with this invention, as the shellac coatings produced by the inventive shellac coating compositions are largely resistance to this blushing phenomenon.

Fatty Acid Component

Fatty acids are aliphatic carboxylic acids whose carbon chains contain 4 to 28 carbon atoms. Fatty acids can be saturated as well as unsaturated with one, two, three, four or more ethylenic unsaturation groups. Fatty acids whose aliphatic tails contain fewer than six carbon atoms are generally regarded as short chain fatty acids (SCFA). Fatty acids whose aliphatic tails contain 6-12 carbon atoms are generally regarded as medium chain fatty acids (MCFA). Fatty acids whose aliphatic tails contain 13-21 carbon atoms are generally regarded as long chain fatty acids (LCFA). Fatty acids whose aliphatic tails contain 22 or more carbon atoms are generally regarded as very long chain fatty acids (VLCFA). Most naturally occurring fatty acids have an even number of carbon atoms. All such fatty acids can be used as the fatty acid component of the inventive shellac coating compositions.

In addition to the above "free" fatty acids, numerous fatty acid derivatives can also be used for this purpose. Examples include esters of such free fatty acids with monoalcohols or dialcohols containing 8 or less carbon atoms, fatty acid monoglycerides, fatty acid digylcerides, fatty acid triglycerides, fatty acid phospholipids, fatty alcohols and mixtures thereof. Esters of free fatty acids with monoalcohols or dialcohols as well fatty acid monoglycerides, digylcerides and triglycerides are interesting, while free fatty acids and especially oleic acid, stearic acid and palmitic acid are especially interesting.

As well understood in industry, these free fatty acids and analogues are available in a number of different grades, e.g., food grade, industrial grade, etc. All of these different grades can be used in this invention, it being desirable of course that the particular grade selected for a particular application comply with the legal regulations applicable to that application.

Additional Ingredients

In addition to shellac and fatty acid component, the inventive shellac coating compositions can also contain additional ingredients to improve the properties of these coating compositions as well as the coatings they produce.

For example, the inventive shellac coating compositions can contain a polymerization retardant to help slow the polymerization of the shellac, examples of which include sodium hydroxide, potassium hydroxide and potassium acetate.

In addition, the inventive shellac coating compositions can contain an organic origin (i.e., plant or animal origin) co-film former. Examples include certain microcrystalline cellulose; waxes such as paraffin wax, carnauba wax, beeswax, candelila wax and polyethylene wax; various naturally-occurring resins such as wood resin; and coumarone-indene; and various proteins including corn zein (a-zein, b-zein and/or v-zein), wheat gluten, soy protein, peanut protein, keratin, collagen, gelatin, milk protein (casein) and whey protein.

The inventive shellac coating compositions can also contain other types of film formers including organic-origin film forming materials not exhibiting the above water vapor resistance properties. Examples include microcrystalline cellulose; starches and derivatives such as raw starch, modified starch, pregelatinized starch, dextrin, maltodextrin corn syrup sucrose, dextrose/fructose and sugar polyols; extrudate gums such as gum arabic, gum ghatti, gum karaya and gum tragacanth; seed gums such as guar gum and locust bean gum; microbial fermentation gums such as xanthan, gallan gum and chitosan; seaweed extracts such as agar, alginates, carageenans and furcellaran; and pectins.

The inventive shellac coating compositions can also contain plasticizers other than lipids such as polyethylene glycol (PEG), polypropylene glycol (PPG), and the like; coloring agents such as organic pigments and inorganic pigments, dyes and other naturally occurring colorants; flavorants and preservatives.

To aid in their application to substrates when in powder form, the inventive shellac coating compositions can also contain conventional flow control agents such as silicates, stearates, and the like.

Mixtures of these different additional ingredients, of course, can be used.

Method of Manufacture

The inventive shellac coating composition can be easily made by heating the fatty acid component to above the melting temperature of the shellac and then adding the shellac, preferably in the form of a comminuted solid, and preferably in increments, to the fatty acid component with continued heating and mixing until a homogeneous blend is obtained. Any additional ingredients are preferably added at this time, although they can be added earlier if desired.

When the inventive shellac coating composition is intended to be applied to a substrate by extrusion coating, another way it can be made is by combining its ingredients together in a common feed hopper used for feeding the extruder or, alternatively, by feeding these ingredients to the extruder by means of separate feed hoppers with these ingredients being blended together inside the extruder as it melts and deposits these materials on the substrate being coated.

Proportions of Ingredients and Properties

The relative amounts of shellac and fatty acid component in the inventive shellac coating compositions can vary widely, and essentially any amount can be used. Normally, the weight ratio of fatty acid component to shellac is between 5:95 and 95:5. Within these broad limits, shellac coating compositions containing no more than 80 wt. % fatty acid component, based on the combined weights of the fatty acid component and shellac are interesting, with those containing no more than 65 wt. % fatty acid component, no more than 50 wt. % fatty acid component, no more than 45 wt. % fatty acid component, no more than 40 wt. % fatty acid component, no more than 35 wt. % fatty acid component and even no more than 30 wt. % fatty acid component, on the same basis, being more interesting. Normally, the weight ratio of fatty acid component to shellac is between 10:90 and 50:50.

If additional ingredients are included in the inventive shellac coating compositions, the total amount (concentration) of these additional ingredients in the inventive shellac coating compositions is desirably no more than 25 wt. %, based on the weight of the entire coating composition. More desirably, the total amount (concentration) of these additional ingredients in the inventive shellac coating compositions is no more than 15 wt. %, no more than 10 wt. %, no more than 5 wt. %, no more than 2 wt. %, no more than 1 wt. %. or even no more than 0.5 wt. %.

As indicated above, the inventive shellac coating compositions are either free or essentially free of a volatile carrier liquid having an equilibrium vapor pressure at 25° C. above 0.02 atm (15.9 torr). Thus, the inventive shellac coating compositions are either free or essentially free of water (vapor pressure at 25° C. of 0.03 atm/23.8 torr) of ethyl alcohol (vapor pressure at 25° C. of 0.077 atm/59 torr) and of 2-propanol (vapor pressure at 25° C. of 0.059 atm/45 torr). "Essentially free" in this context means that the inventive shellac coating compositions contain no more than 10 wt. % of the volatile carrier liquid. More commonly, however, the inventive shellac coating compositions contain no more than 5 wt. %, no more than 2 wt. %, no more than 1 wt. %, no more than 0.5 wt. %, or even no more than 0.1 wt. % of such a volatile carrier liquid. Nonetheless, they can easily be converted to a liquid state for coating purposes by heating them to above the melting temperature of the shellac ingredient they contain.

As previously indicated, it has been found in accordance with this invention that the fatty acid component of the inventive shellac coating compositions acts as a polymerization inhibitor, thereby inhibiting polymerization of the shellac ingredient of these compositions when heated to elevated temperatures. As a result, new shellac coating composition are provided which are essentially free of volatile carrier liquids yet can be made sufficiently liquid to serve as effective coating compositions by simple heating.

The physical form of the inventive shellac coating compositions can vary widely. Depending on the relative amounts of shellac and fatty acid component, the type of fatty acid component and the type of optional additional additive, if any, the inventive shellac coating compositions may take the form of a viscous liquid, a paste-like semi-solid state (i.e., too viscous to flow by gravity yet not a hard solid either) such as butter or bees wax or a solid rigid mass at room temperature. Moreover, if in a solid state they can assume any structure ranging from a large solid block, chunks, granular solids, fine powders, and even thin films produced by removing a cast film from a substrate. In addition, if in a solid state at room temperature, they can assume a wide range of melting or softening points, typically ranging from 10° C. to 90° C. Within this broad range, those exhibiting melting or softening points of at least 20° C., at least 30° C., at least 40° C., and at least 50° C., are more interesting.

The physical and chemical properties of the shellac coatings produced by the inventive shellac coating compositions can also vary widely, depending on the relative amounts of shellac and fatty acid component, the type of fatty acid component and the type of optional additional additive, if any, included in these coating compositions. By suitable selection of these variables, skilled shellac chemists should have no difficultly in producing shellac coating compositions having the same or essentially the same hardness, flexibility, barrier properties and other properties as shellac coatings made by conventional techniques.

Substrate

The inventive shellac coating compositions can be used to provide shellac coatings on any and all types of substrates previously provided with shellac coatings. For example, the inventive shellac coating compositions can be used to provide shellac coatings on industrial substrates such as wood, metals, plastics, etc. In addition, edible substrates including fruits such as apples, pears, etc.; vegetables: bakery products such as biscuits, cookies, wafers, waffles, ice cream cones, and other dough based products; candy such as solid chocolate bars, pastilles etc. as well as chocolate coated or embed products chocolate coated biscuits and cookies; pharmaceuticals such as pills, lozenges, etc. can also be coated with the inventive shellac coating compositions, it being desirable of course to use food grade ingredients and processing equipment for this purpose. Products intended to come into contact with food and/or pharmaceuticals such as fiber box board, food service trays, utensils, etc., can also be coated with the inventive shellac coating compositions, again it being desirable to use food-contact approved grade ingredients and processing equipment for this purpose.

In one embodiment of this invention, the inventive shellac coating compositions can be used to form cast, free-standing films. In this embodiment, conventional substrates used for producing cast, free-standing films from other similar materials can be used for this purpose.

Method of Application

The inventive shellac coating compositions can be applied to substrates by any appropriate coating technique, examples of which include spraying (both traditional and electrostatic spray techniques), dipping, enrobing, casting, extrusion coating, pan coating and roller coating. Normally, this means that the inventive coating composition, if in a solid state at room temperature, will need to be heated until the composition assumes a liquid state prior to the application of the coating composition to its substrate. So, for example, if the inventive coating composition is applied by dipping, enrobing, casting, hot melt spraying, roller coating, or some types of pan coating techniques, the coating composition will normally be heated to a liquid state before it is applied. Since the fatty acid component of the inventive shellac coating compositions inhibits polymerization of the shellac ingredient in these compositions, this is of little or no concern.

In certain applications, the inventive shellac coating compositions can be heated to a liquid state as part of the coating process. This can occur, for example, if the inventive shellac coating composition is applied by extrusion coating techniques. In addition, this can also occur if the inventive shellac coating composition is applied by certain types of spray coating techniques, for example, via melt spraying or by electrostatic spraying of the composition in the form of a dry powder. This can also occur if the inventive shellac coating composition, in the form of a particulate, is applied to a substrate which has been previously heated enough so that the latent heat in the substrate melts the particulate, thereby forming a coating. In some situations, an additional heating step may be used to subject the substrate to heating after the powder is applied if necessary. Heating may occur both before and after application as necessary.

A particular advantage of the inventive coating composition when directly applied to bakery product substrates such as biscuits, cookies, wafers, cones, and other dough based products is that the crispness of the underlying substrate is preserved. This is difficult or impossible to do when conventional shellac coating compositions are used in this way, because the carrier liquid in the coating composition is normally absorbed by the bakery product substrate. This problem is eliminated when the inventive shellac coating composition is used, because it contains no carrier liquid.

In another application, the inventive coating composition is used as an adhesive, or carrier, for components to be added to a substrate's surface. For example, various food adjuvants such as drugs, medications, vaccines, food supplements, etc., can be added to many different types of food substrates such as whole grains, breads, flours, and other food items by coating them with the inventive coating composition which has been fortified with the food adjuvant.

Finally, the inventive coating composition, when in the form of a fine powder, can also be used as a polishing agent by combining it with a batch of the substrate to be treated, e.g., tablets, confections, or the like, in a suitable mixing device such as panning equipment or a tumbling apparatus which generates enough friction between these materials so that a polished surface on the substrate is produced. This buffing process can enhance surface characteristics of the substrate, adding a polished effect, as well as producing a coating which provides slip characteristics, barrier to moisture, etc.

WORKING EXAMPLES

Example 1

The following hot melt blends were prepared:

TABLE 1

| Shellac | Fatty Acid | Blend Ratio (Fatty Acid:Shellac) |
| --- | --- | --- |
| Refined Orange | Oleic Acid | 18:82 |
| | Stearic Acid | 18:82 |
| | Palmitic Acid | 50:50 |

To prepare the blends listed in Table 1 above, the fatty acid of each composition was heated to above the melting point of the refined (dewaxed) orange shellac in a suitable container (aluminum pan or glass beaker of appropriate size). With slow mixing, the dewaxed orange shellac was melted and blended into the molten fatty acid in a stepwise fashion. From this point forward, the molten blend was allowed to cool to form the inventive hot melt blend in its solid phase.

Each blend produced an opaque semi-malleable solid, able to be returned to a molten state upon reheating to above its melting point. The softening points of the above hot melt blends ranged from about 60° C. to 85° C.

Example 2

The following hot melt blends were prepared:

TABLE 2

| Fatty Acid | Shellac | Blend Ratio (Fatty Acid:Shellac) |
| --- | --- | --- |
| Oleic Acid | Refined Orange | 33:67 |
| | Orange Flaked | 33:67 |
| | Refined Bleached | 33:67 |
| | Regular Bleached | 33:67 |

To prepare the blends listed in Table 2 above, the selected fatty acid was heated to above the melting point of the shellac type used in each example in a suitable container (aluminum pan or glass beaker of appropriate size). With slow mixing, the appropriate amount of shellac was melted and blended into the molten fatty acid in a stepwise fashion. From this point forward, the molten blend was allowed to cool to form each inventive hot melt blend in its solid phase. Each blend produces an opaque, semi-malleable solid for further use.

Example 3

A hot melt blend comprising: 43 parts by weight dewaxed orange shellac and 57 parts by weight of a mixture of oleic acid and stearic acid was prepared by the same procedure described above in connection with Examples 1 and 2. This molten product was applied to a coated sheet of cardstock suitable for the release of the finished product, after which the product was allowed to cool to a solid state. The solid product so formed was then removed from the substrate and ground into large flakes approximately 1 in$^2$ (~645 mm$^2$) in size.

Example 4

A portion of the flakes produced in the above Example 3 was placed into the feed chamber of a hot melt spray gun designed for spray application of waxes (supplied by Glue Machinery Corporation) and allowed to melt at a set temperature for a period of 10 minutes.

After melting, the composition was sprayed onto an edible waffle cone substrate at an application rate of about 18% of the total dry weight of the coated edible substrate. The applied composition was then allowed to cool to room temperature, thereby forming a solid shellac coating providing the substrate with extra or enhanced properties ranging from enhanced physical appearance, enhanced strengthening and enhanced barrier properties such as an enhanced resistance to the transmission of liquids such as water, milk and melted ice cream as well as vapors emanating from such liquids.

Although only a few embodiments have been described above, it should be appreciated that many modifications can be made without departing from the spirit and scope of the invention. All such modifications are intended to be included within the scope of this invention, which is to be limited only by the following claims:

The invention claimed is:

1. A process for providing a shellac coating on a bakery product substrate comprising applying to the bakery product substrate a molten shellac coating composition comprising a fatty acid component and shellac, wherein the weight ratio of the fatty acid component to the shellac is 5:95 to 95:5, wherein the coating composition has been made without dissolving or dispersing the shellac in more than 10 wt. % of a volatile carrier liquid having an equilibrium vapor pressure at 25° C. above 0.02 atm (15.9 torr), this percent being based on the weight of the shellac coating composition as a whole, and further wherein the molten coating composition is formulated in a manner which inhibits polymerization of the shellac when the coating composition is heated to molten form thereby providing a shellac coating on said substrate, wherein the shellac coating composition comprises a total of no more than 25 wt. % of additional ingredients other than the fatty acid component and the shellac, based on the weight of the entire coating composition.

2. The process of claim 1, wherein the substrate is an ice cream cone or waffle.

3. The process of claim 1, wherein the weight ratio of the fatty acid component to the shellac is 5:95 to 57:43.

4. The process of claim 1, wherein the fatty acid component is selected from the group consisting of a free fatty acid, a fatty acid monoglyceride, a fatty acid diglyceride, a fatty acid triglyceride, and mixtures thereof.

5. The process of claim 4, wherein the fatty acid component is a free fatty acid.

6. The process of claim 1, wherein the shellac coating composition is in a solid state at room temperature, and further wherein the shellac coating composition has a softening temperature of 40° C. to 120° C.

7. The process of claim 1, wherein the additional ingredients are selected from the group consisting of a shellac plasticizer other than a fatty acid component, a shellac polymerization retardant other than a fatty acid component, a detackifier, a coloring agent, a co-film former, a flavoring agent and a preservative, and further wherein the total amount of these additional ingredients in the coating composition is no more than 15 wt. %, based on the weight of the entire coating composition.

8. A coated article made by the process of claim 1.

9. The process of claim 1, wherein the substrate is an ice cream cone or waffle, wherein the fatty acid component comprises oleic acid, stearic acid, palmitic acid or mixtures thereof, wherein the weight ratio of the fatty acid component to the shellac is 5:95 to 57:43, and wherein the shellac coating composition is applied to the substrate by melt spraying.

10. A coated article made by the process of claim 9.

11. The process of claim 1, wherein the shellac coating composition has a softening temperature of at least 30° C.

12. The process of claim 1, wherein the shellac coating composition is made by combining the shellac and fatty acid component at a temperature above a melting temperature of the shellac.

13. The process of claim 12, wherein after the shellac and fatty acid component are combined at a temperature above the melting temperature of the shellac, the coating composition so formed is cooled until the coating composition takes the form of either (a) a paste-like semi-solid which is too viscous to flow by gravity yet not a solid either or (b) a solid, and wherein the process further comprises heating the coating composition to a liquid state before the coating composition is applied to the bakery product substrate.

14. The process of claim 1, wherein the coating composition is a pre-formed solid which is heated from solid to molten form for applying to the bakery product substrate.

15. The process of claim 14, wherein the coating composition is heated from solid to molten form by (a) combining the shellac and fatty acid component at a temperature above a melting temperature of the shellac to form a molten mixture, (b) cooling the molten mixture until it solidifies, and then (c) heating the solidified mixture until molten.

16. The process of claim 1, wherein the coating composition contains no more than 2 wt. % of the volatile carrier liquid.

17. The process of claim 1, wherein the coating composition is free of a volatile carrier liquid having an equilibrium vapor pressure at 25° C. above 0.02 atm (15.9 torr).

18. A process for providing a shellac coating on a bakery product substrate comprising
(a) heating a mixture of a fatty acid component and shellac to transform the mixture from solid to molten form without dissolving or dispersing the mixture in a volatile carrier liquid having an equilibrium vapor pressure at 25° C. above 0.02 atm (15.9 torr),
(b) applying the molten mixture so formed to the bakery product substrate, thereby forming a molten shellac coating on the substrate, and
(c) allowing the molten shellac coating to solidify,
wherein the mixture comprises a total of no more than 25 wt. % of additional ingredients other than the fatty acid component and the shellac, based on the weight of the entire mixture.

19. The process of claim 18, wherein the mixture of a fatty acid component and shellac is a homogeneous blend which is formed by heating the fatty acid component to above a melting temperature of the shellac and then adding the shellac to the fatty acid component.

20. The process of claim 19, wherein the homogeneous blend is cooled to a solid state before being heated to transform the mixture of fatty acid component and shellac from solid to molten form in step (a).

21. The product of the process of claim 20.

22. The product of the process of claim 18.

23. A process for providing a shellac coating on a bakery product substrate comprising
(a) heating a mixture of a fatty acid component and shellac to transform the mixture from solid to molten form without dissolving or dispersing the mixture in more than 10 wt. % of a volatile carrier liquid having an equilibrium vapor pressure at 25° C. above 0.02 atm (15.9 torr), this weight percent being based on the weight of the mixture as a whole,
(b) applying the molten mixture so formed to the bakery product substrate, thereby forming a molten shellac coating on the substrate, and
(c) allowing the molten shellac coating to solidify,
wherein the mixture comprises a total of no more than 25 wt. % of additional ingredients other than the fatty acid component and the shellac, based on the weight of the entire mixture.

24. The process of claim 23, wherein
the weight ratio of fatty acid component to shellac in the mixture is 5:95 to 95:5, and
the total amount of the additional ingredients in the coating composition, in addition to shellac and the fatty acid component, is no more than 15 wt. %, based on the weight of the entire coating composition.

25. The process of claim 24, wherein the coating composition contains no more than 2 wt. % of the volatile carrier liquid.

26. The process of claim 25, wherein the coating composition is free of a volatile carrier liquid having an equilibrium vapor pressure at 25° C. above 0.02 atm (15.9 torr).

* * * * *